April 28, 1953

J. B. SMITH 2,636,636

COVER FOR COOKING UTENSILS

Filed Feb. 23, 1952

INVENTOR
JOHN B. SMITH
BY
Charles S. Evans
his ATTORNEY

Patented Apr. 28, 1953

2,636,636

UNITED STATES PATENT OFFICE 2,636,636

COVER FOR COOKING UTENSILS

John B. Smith, Oakland, Calif.

Application February 23, 1952, Serial No. 272,925

1 Claim. (Cl. 220—44)

My invention relates to cooking utensils; and more particularly to a cover therefor.

One of the objects of my invention is the provision of a cover by which the heat in a cooking utensil may be conserved, while at the same time the steam generated by the cooking may be released in part.

Another object is the provision of a cooking utensil cover which allows steam to escape and at the same time intercepts drops of liquid which have been splashed or spattered, and allows them to run back into the utensil.

The invention possesses other objects and features of value, which, with the foregoing, will be brought out in the following description of the invention. I do not limit myself to the showing made by the said description and the drawings, since I may adopt variant forms of the invention within the scope of the appended claim.

Figure 1:
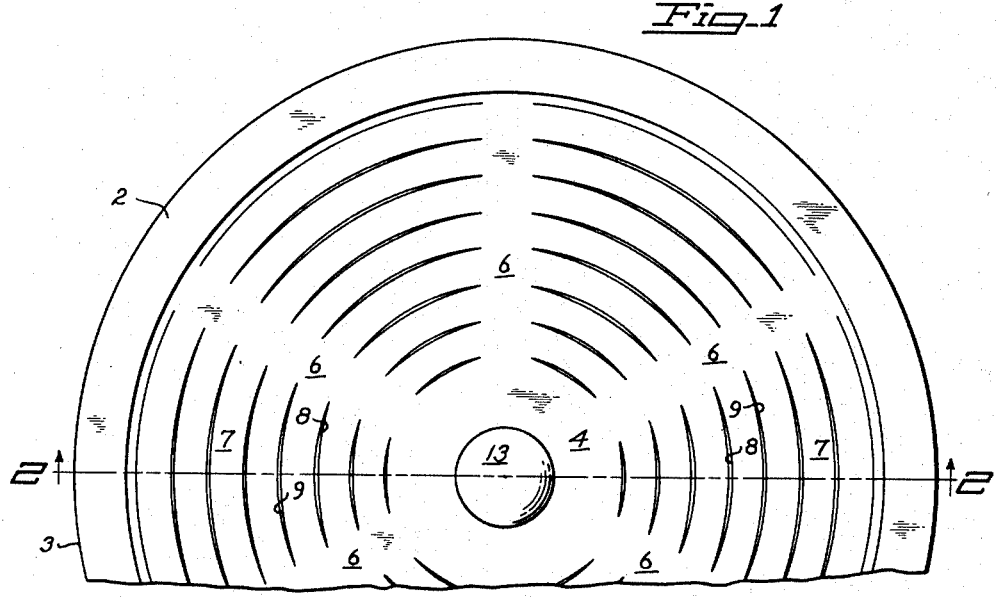
Figure 3:
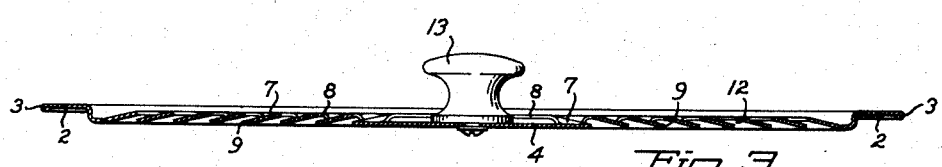
Figure 2:
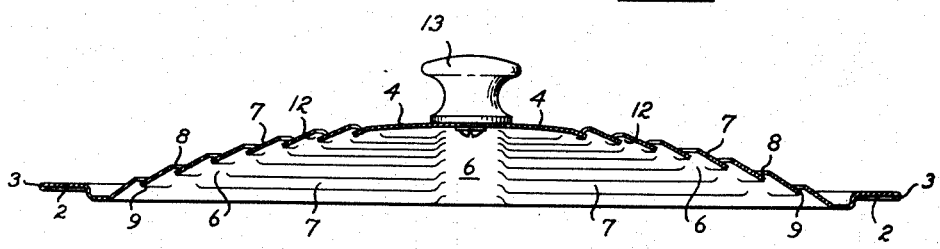

Referring to the drawings, Fig. 1 is a plan view of a cover embodying my invention. Fig. 2 is a vertical sectional view of my cover taken in the plane indicated by line 2—2 of Fig. 1. Fig. 3 is a vertical sectional view similar to Fig. 2, but showing a flat cover instead of a dished one.

Broadly considered, the cooking utensil cover of my invention comprises a flattened body provided with a plurality of strip portions severed from the rest of the body along opposite edges and connected thereto only at their ends. The strip portions are inclined to the general conformation or contour of the body so that spaces are provided between successive portions. These spaces allow the passage of steam while the inclined portions intercept spatter and reflect heat back into the utensil. The body may have a flat contour diametrically as in Fig. 3 but for appearance and strength I prefer a flattened dome or inverted saucer contour as shown in Fig. 2.

More specifically and referring to the drawings, the cooking utensil cover of my invention comprises a body plate, formed preferably in general conformation to an inverted saucer or flattened dome. Around its periphery, the body is provided with a utensil engaging lip or rim 2, having the beaded edge 3. The rim is integrally connected to the central portion 4 of the body by a plurality of narrow radially extending plain body portions 6 circumferentially spaced about the cover. In the embodiment shown, six such body portions are provided.

As can best be seen in Fig. 1, the surface of the cover is divided into a plurality of sectors, each sector being bounded on one side by the arcuate rim 2, subtended by the two radially extending portions 6, forming its radial boundaries. The intersection of the portions 6 at their inner ends with the central body portion 4, forms the inner boundary of each sector.

Within each sector, and commencing adjacent the rim, the body of the cover comprises strip portions 7, preferably arcuate in shape; and partially separated from the body and from each other so that two spaced concentric edges 8 and 9 are presented. This may be accomplished by suitable dies which sever the two edges from the body plate and tip the strip at an angle to the general conformation of the plate. The under surface of my cover acts to reflect the heat of cooking back into the utensil; and in this respect is substantially equal to an imperforate cover.

It will be understood that the major part of the surface presented by each sector is taken up or divided between a plurality of strips, the groups of which range inwardly to the central portion 4. The bending up of each strip leaves a space 12 between it and the next succeeding strip, thus providing escape passages for steam from the utensil. Preferably, as seen in Figs. 2 and 3, the upper edge 8 of each strip is substantially vertically above the lower edge 9 of the next succeeding strip, the escaping steam thus being baffled inwardly toward the center of the cover by the angular position of each strip. At the same time, splashed liquid or spatter is intercepted by the strips, collecting and coalescing into drops on the under side of the edge 9 of each strip until they fall back into the utensil. A portion of the steam generated in the utensil also condenses on the strips and coalesces into drops.

I claim:

A cover for a cooking utensil having a generally domed shape and comprising a body plate, radially spaced arcuate slits in said body plate forming a plurality of arcuate strip portions radially spaced about the center of the body plate in a plurality of separate groups, each strip portion being separated from and inclined to the surface of the body along its long edges and being integral therewith along its ends, the adjacent long edges of adjoining strip portions being in substantially vertical alignment with the radially outward long edge of each strip portion lying beneath the radially inward long edge of an adjoining strip portion, whereby steam from said cooking utensil is baffled toward the center of said cover and condensation collects on the radially outward lower edge of each strip portion.

JOHN B. SMITH.

References Cited in the file of this patent

UNITED STATES PATENTS

| Number | Name | Date |
|---|---|---|
| 1,831,654 | Cross | Nov. 10, 1931 |
| 2,227,990 | Zelt | Jan. 7, 1941 |
| 2,348,452 | Christopher | May 9, 1944 |
| 2,415,613 | Sulak | Feb. 11, 1947 |
| 2,565,555 | Goldberg | Aug. 28, 1951 |